United States Patent [19]

Takatori et al.

[11] Patent Number: 5,251,841
[45] Date of Patent: Oct. 12, 1993

[54] PHOTOGRAPHIC FILM CASSETTE

[75] Inventors: Tetsuya Takatori; Toshiharu Naito, both of Kanagawa, Japan

[73] Assignee: Fuji Photo Film Co., Ltd., Kanagawa, Japan

[21] Appl. No.: 901,841

[22] Filed: Jun. 22, 1992

[30] Foreign Application Priority Data

Jun. 20, 1991 [JP] Japan .................................. 3-176164

[51] Int. Cl.⁵ .............................................. G03B 17/26
[52] U.S. Cl. .................................... 242/71.1; 242/71.8
[58] Field of Search ...................... 242/71, 71.1, 71.7, 242/71.8, 55, 53; 354/275, 277; 352/75, 78 R; 355/72

[56] References Cited

U.S. PATENT DOCUMENTS

| | | | |
|---|---|---|---|
| 4,846,418 | 7/1989 | Fairman | 242/71.1 |
| 4,887,776 | 12/1989 | Niedospial, Jr. et al. | 242/71.1 |
| 5,031,855 | 7/1991 | Wolf et al. | 242/71.1 |
| 5,040,739 | 8/1991 | Wolf et al. | 242/71.1 |
| 5,046,679 | 9/1991 | Wolf et al. | 242/71.1 |

FOREIGN PATENT DOCUMENTS 63-26697  5/1988  Japan .

*Primary Examiner*—Daniel P. Stodola
*Assistant Examiner*—John P. Darling
*Attorney, Agent, or Firm*—Sughrue, Mion, Zinn, Macpeak & Seas

[57] ABSTRACT

A photographic film cassette has a spool with a photographic film wound in a roll thereon. When the spool is rotated in a film unwinding direction, a photographic film leader is caused to advance outward from a cassette shell. The spool is constituted of two spool pieces which are rotatably and slidably coupled together via a guide shaft formed on the spool piece and a sleeve formed on the other spool piece. Each spool piece has a flange and a core. A cam follower is formed on the guide shaft and a cam groove is formed in the sleeve to receive the cam follower. The spool is thereby lengthened and shortened when the spool pieces are rotated relative to each other. Accordingly, when the spool is rotated, the flanges tightly clamp the photographic film roll laterally. The cam groove is formed so as to be closed to a core end which is coupled to the other core. A recess is formed in the inside of the sleeve, and the recess is adapted to receiving the cam follower so as to allow insertion thereof into the cam groove. The cam follower extends to an end face of a core end of the spool piece, whereby the cam follower is resistant to fracture. A pair of tongues are formed respectively on the spool pieces, and are engaged together to transmit rotation of the one spool piece to the other eve if the cam follower is broken. A projection is formed on the first spool piece, to be received by a claw formed on the second spool piece. The spool pieces are thereby prevented from being taken apart in the axial direction.

37 Claims, 11 Drawing Sheets

PHOTOGRAPHIC FILM CASSETTE

BACKGROUND OF THE INVENTION

1. Field of the Invention

The present invention relates to a photographic film cassette, more particularly, the present invention relates to an improvement of a photographic film cassette in which rotation of a spool causes a leader of a photographic film to advance to the outside of a cassette shell.

2. Description of the Related Art

A known photographic film cassette includes a photographic filmstrip (hereinafter referred to as film) positioned so that a leader of the photographic film does not protrude form the cassette shell prior to loading the cassette in a camera. Such a cassette is easily loaded into a camera. A simple film-advancing mechanism of the camera is typically used with the type of cassette, and includes a construction which rotates a spool to unwind the photographic film, thereby causing the leader to move through a passageway formed in the cassette and to exit therefrom.

In the above-mentioned type of cassette, the roll of photographic film wound on the spool is prevented from loosening, when the spool is rotated, in order to transmit the rotation of the spool to the leader. In a cassette as disclosed in U.S. Pat. No. 4,846,418 and 4,887,776, the spool has a pair of spool pieces axially slidable relative to each other. A first spool pieces is provided with a first spool flange and a cam follower, whereas the second spool piece is provided with a second spool flange and a cam groove formed to receive the cam follower. When the spool pieces are rotated relative to one another, the cam follower is guided along the cam groove so as to shorten the axial interval between the two flanges by sliding the spool pieces axially relative to one another. When sliding the spool pieces, at least the outermost turn of the roll is clamped between the flanges so that the roll is integrally rotatable with the spool and is thus prevented from loosening.

The cam mechanism of the cassette described above, however, is low in strength. When the two spool pieces are assembled together to engage the cam follower with the cam groove, an auxiliary structure is necessary for convenience in inserting the cam follower into the cam groove by passing the cam follower through a sleeve of a core end of the second spool piece. The cassette disclosed in U.S. Pat. No. 4,846,418 has a cam follower with slits in two lateral sides thereof so as to allow the cam follower to flex so as to allow the cam follower to pass through the inside of the second spool piece. Although the sleeve-formed core end associated with the cam groove is strong enough, the cam follower is low in strength. The cassette disclosed in U.S. Pat. No. 4,887,776, on the other hand, has a cam groove with a slit communicating to the core end of the second spool piece. The cam follower is guided through this slit upon assembly. Although the cam follower of this device is strong, the core end associated with the cam groove is low in strength, as the cam groove is open to the core end.

Also, the cam follower may be destroyed when an excessive force is abruptly applied thereto, as the cam follower is formed to project in a long and thin shape. Once the cam follower is broken, the photographic film can be neither advanced nor wound up in the cassette shell, as a trailer of the photographic film is anchored on the second spool piece which is separate from the first spool piece. The first spool piece is rotated by the camera.

When the spool pieces have been assembled together, they may become disengaged unless both spool pieces are supported in the axial direction. The shortenable spool that is susceptible to being taken apart thus requires a cassette having an exceedingly complicated device for transporting and supporting the spool during manufacture.

SUMMARY OF THE INVENTION

In view of the foregoing problems, an object of the present invention is to provide a leader-advancing photographic film cassette having a shortenable spool with a strong cam mechanism.

Another object of the present invention is to provide a leader-advancing photographic film cassette in which, even after a cam mechanism of a shortenable spool is broken, the photographic film can be wound up around the spool.

A further object of the present invention is to provide a leader-advancing photographic film cassette of which a shortenable spool can be handled easily during assembly of the cassette.

In order to achieve the above and other objects and advantages of this invention, a cam groove formed in a sleeve of one spool piece is closed to a core end of the sleeve, whereas a recess is formed inside the sleeve, through which a cam follower formed on a guide shaft of another spool piece is inserted into the cam groove.

In accordance with a preferred embodiment, the cam follower is formed to project from a cylinder of the guide shaft in a direction alongside an axial direction of a spool, thereby to be strong enough to have a slight flexibility.

The shortenable spool of the novel photographic film cassette is thus provided with the cam mechanism of a high strength because no slit is formed on either spool piece in association with the cam follower or the cam groove.

Further, auxiliary linkage means is associated with the opposing core ends for engaging the two spool pieces together if the cam mechanism becomes broken, and transmits rotation of the first spool piece to the second spool piece so as to enable rotation of the spool to transport photographic film. Accordingly, photographic film can be wound up around the spool even after the cam mechanism is broken.

Also, a disengagement preventing device is associated with at least one of the core ends for preventing the spool pieces from being disengaged from each other in an axial direction of the spool when the spool pieces are assembled together via the slide mechanism and the cam mechanism. Therefore, it is not necessary, during the process of manufacturing the cassette, to support both of the spool pieces in the axial direction. Thus, the shortenable spool can be handled easily during assembly of the cassette.

BRIEF DESCRIPTION OF THE DRAWINGS

The above objects and advantages of the present invention will become more apparent form the following detailed description when read in connection with the accompanying drawings, in which.

DETAILED DESCRIPTION OF THE PREFERRED EMBODIMENT

Figure 1:
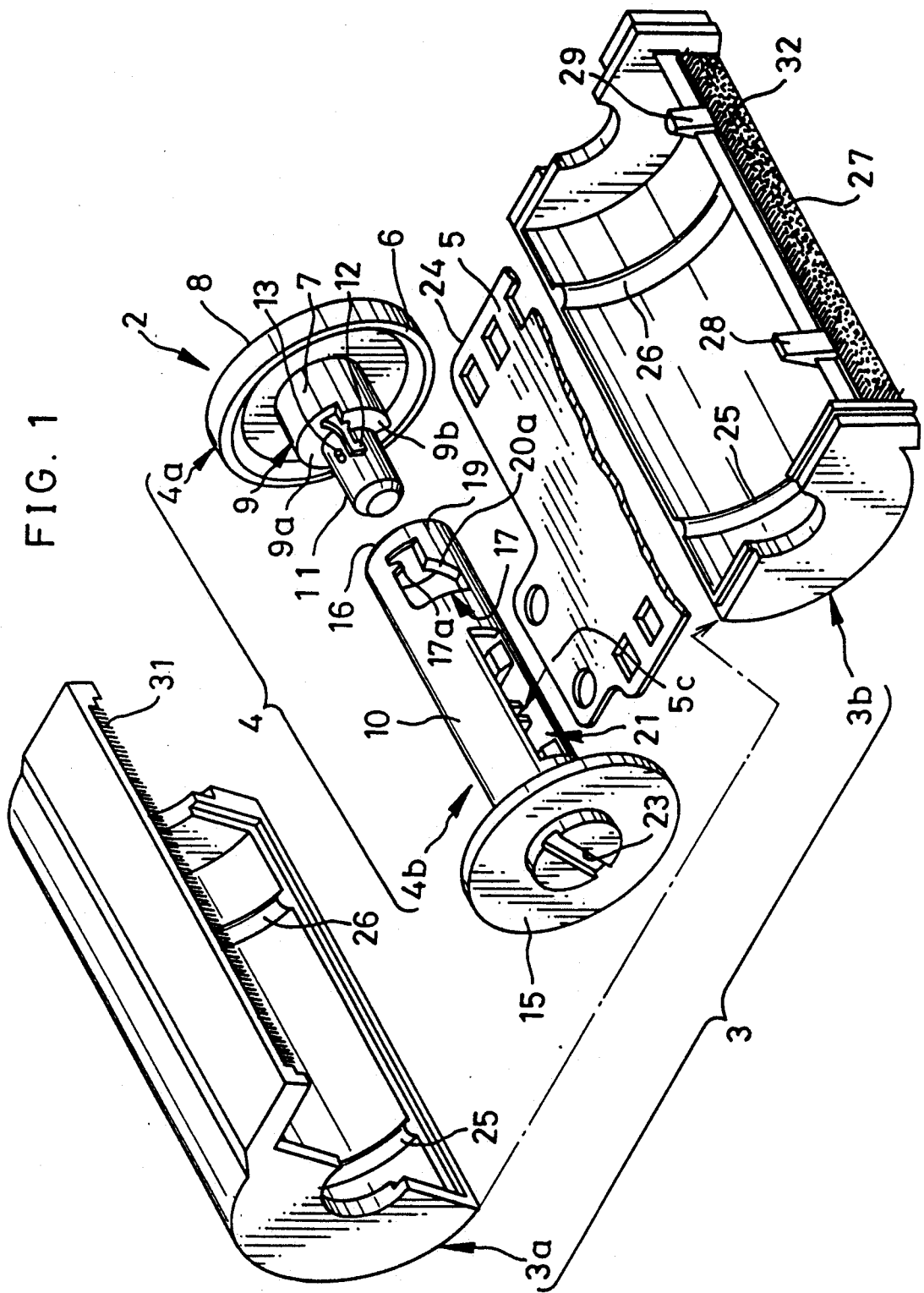
FIG. 1 is an exploded perspective view illustrating a photographic film cassette according to a preferred embodiment of the present invention.

FIGS. 1 to 5 illustrate a first preferred embodiment of the invention. A film cassette 2 is constituted of a cassette shell 3, a spool 4, rotatably contained in the cassette shell 3, and a photographic film 5, wound on the spool 4 in the from of a roll (only a trailer portion of film 5 is illustrated). The cassette shell 3 consists of pair of shell halves 3a and 3b.

The spool 4 is constituted of a pair of spool pieces 4a and 4b connected together so that their axes coincide. Each of the spool pieces 4a and 4b is integrally molded from resin. The right-hand spool piece 4a has a flange 8, a core 9, and a shaft 11 having a diameter smaller than the core 9 and adapted to insertion in a sleeve 16 formed on the left-hand spool piece 4b. The flange 8 is provided with a circumferential lip 6 formed along its peripheral edge. The lip 6 has an inclined contact surface which contacts with one side 24 of the outermost turn of a roll 5b of the photographic film 5 (see FIGS. 11 to 13), and prevents the roll 5b from loosening. A pair of cam followers 12 are formed on the shaft 11 so as to be engaged with cam grooves which are described below (see FIG. 2).

Figure 2:
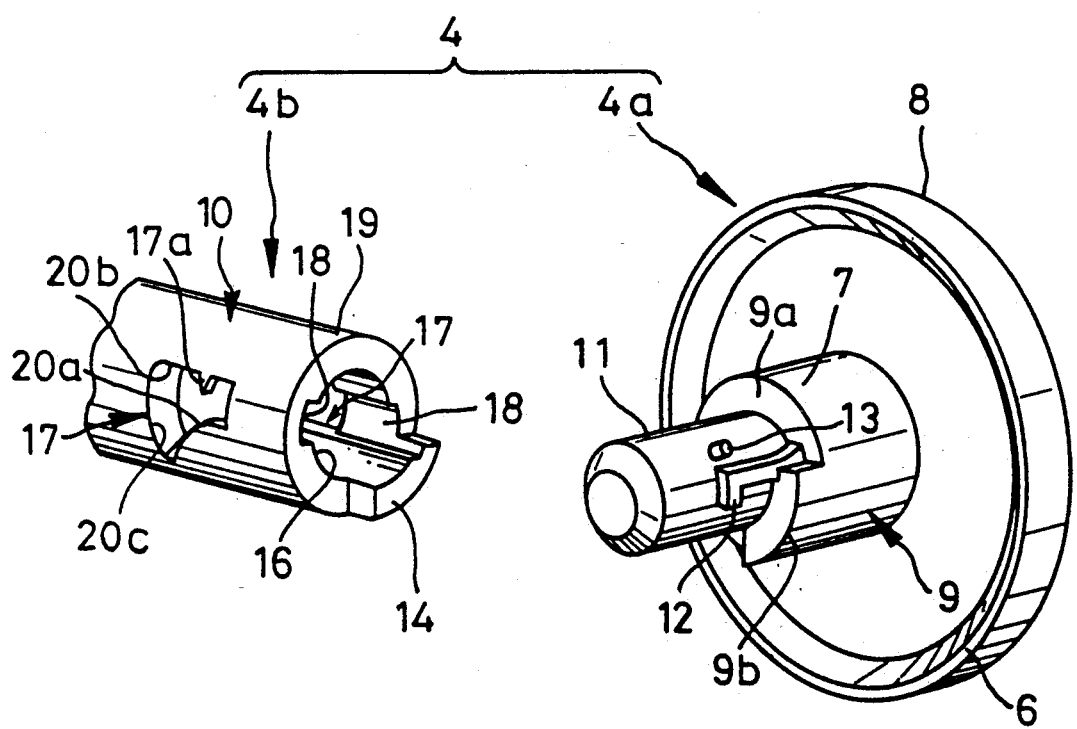
FIG. 2 is an exploded perspective view illustrating an important portion of a spool of the cassette of the preferred embodiment.

The cam followers 12 project not only from the cylindrical surface of the guide shaft 11 but from a stepped end face 9a of an end portion 7 of the right core 9. Accordingly, the cam followers 12 are constructed to have high strength and to be resistant to fracture. A pair of projections 13, to be described below, also project from the guide shaft 11. A tongue 9b is integrally formed on the end face 9a so as to be coupled with a tongue 14 formed on sleeve 16 of spool piece 4b, as illustrated in FIG. 2. The tongues 9b and 14 engage each other and make it possible to rewind the photographic film 5 even if the cam followers 12 should be broken.

Figure 3:
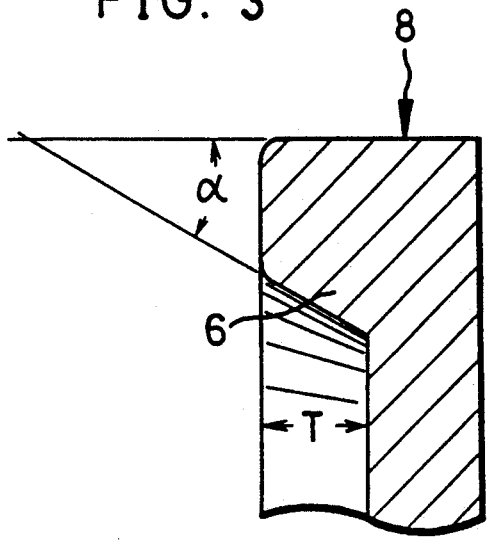
FIG. 3 is a section illustrating an important portion of a flange of the spool of the preferred embodiment.

The top of the lip 6 of the flange 8, as illustrated in FIG. 3, is rounded off at inner and outer positions thereof in order to prevent the photographic film 5 from being damaged and to avoid creating dust due to sliding contact between the one side 24 of the photographic film 5 and the lip 6. The angle $\alpha$ formed by the beveled annular face of the lip 6 is in the range of 30° to 45° with respect to the axial direction of the spool 4. The height T of the lip 6 is determined to be 1 mm, for example.

Figure 4:
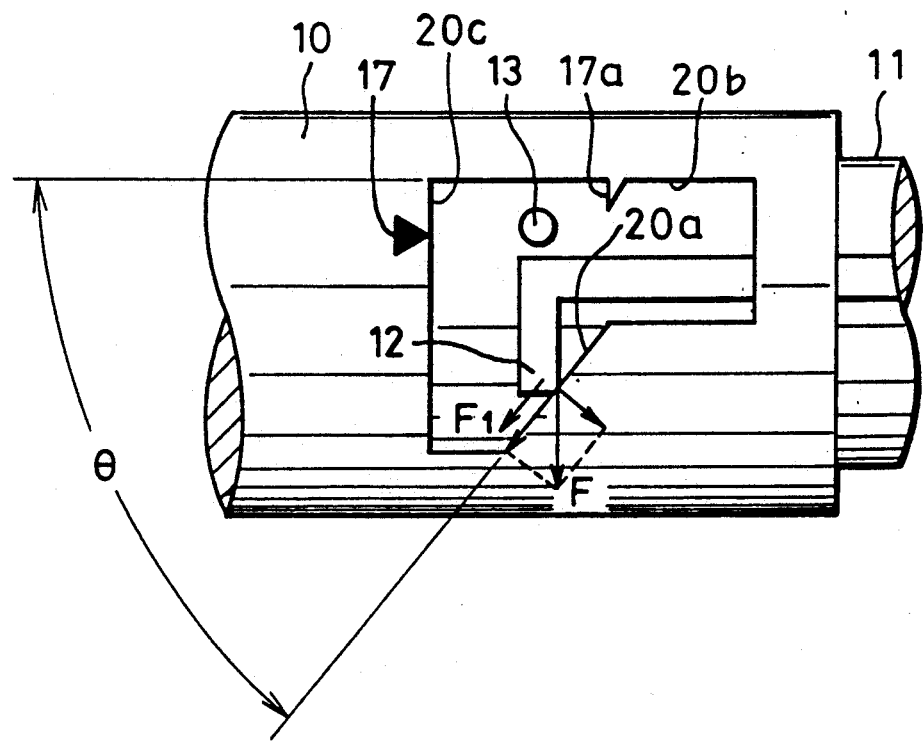
FIG. 4 is a plan view illustrating engagement of a cam follower with a cam edge of a cam groove in the preferred embodiment.

The left spool piece 4b is also provided with a core 10, which has the sleeve 16 into which the guide shaft 11 is inserted. A flat flange 15 is formed on the left core 10. A pair of cam grooves 17 is formed in the sleeve 16 and each is adapted to respectively receive the cam followers 12. The angle $\theta$ of a cam edge or ramp 20a of the cam groove 17, as illustrated in FIG. 4, is determined to be from 50° to 87°, inclusive, with respect to the axial direction. This will be described in detail below.

An end portion 19 of the sleeve 16 is formed to be integrally circumferential without any slit communicating with the cam groove 17, which is thus closed to the end portion 19. However, a recess 18 is formed in the inside of the sleeve 16 within the core 10, which communicates both to the right of the cam groove 17 and to the end portion 19. The recess 18 defines a thin portion in end portion 19. The recess 18 respectively guides the cam follower 12 and the projection 13. On a straight edge 20b of the cam groove 17 is formed a claw 17a for coming into engagement with the projection 13 in order to prevent the right-hand spool piece 4a from slipping away from the left-hand spool piece 4b once engaged therewith.

Figure 5:
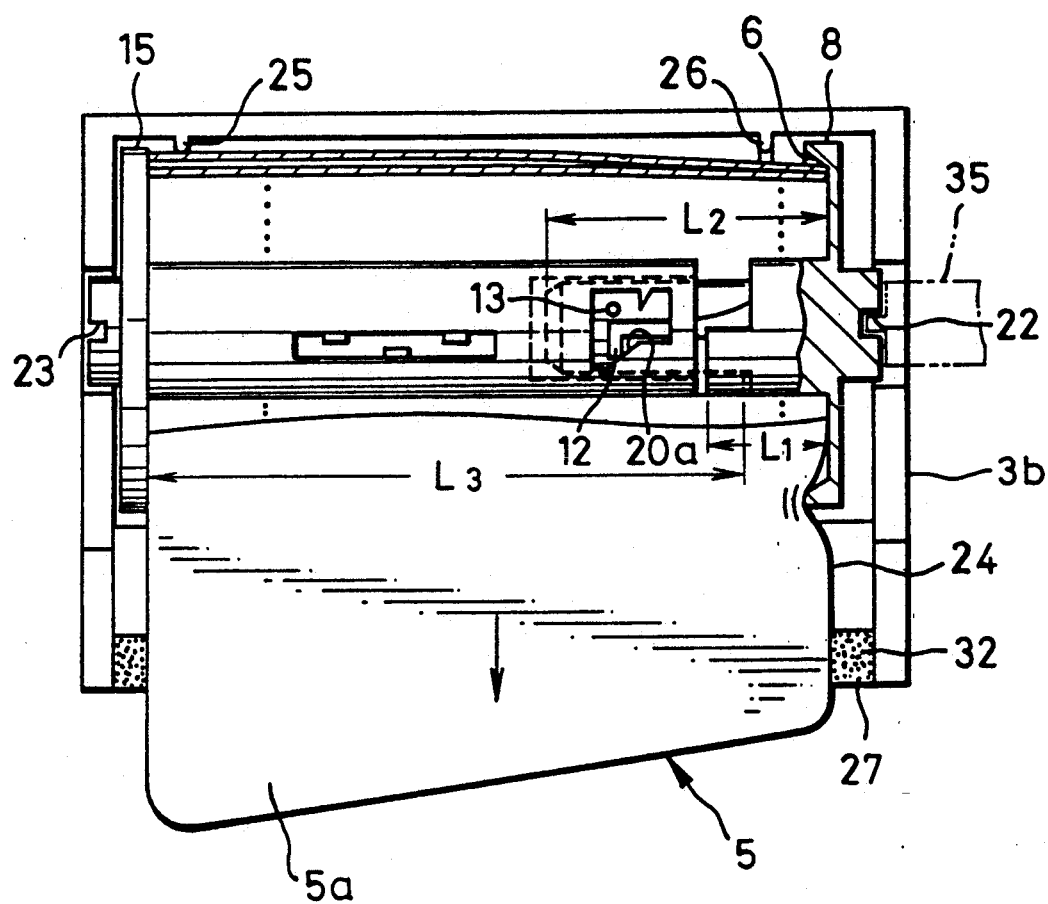
FIG. 5 is a plan view illustrating an advancement of a leader of a photographic film out of the cassette.

A slit 21 is formed in the core 10 for receiving a trailer 5c of the photographic film 5 (see FIG. 1). A trailer anchoring structure having claws is formed in the slit 21. The claws are engaged with holes formed in the trailer 5c so as to anchor the photographic film 5 in the core 10. An engaging recess 22 is formed on the outer end of the right core 9 as illustrated in FIG. 5, and is adapted to engagement with a drive shaft 35 incorporated in a camera. The outer end of the left core 10 is provided with an engaging recess 23, which can be engaged, along with recess 22, with jigs of a machine for assembling the spool for positioning the spool pieces 4a and 4b in the correct angular positions during assembly.

A pair of annular ridges 25 and 26 are formed on the cylindrical inside wall of the cassette shell 3 so as to be in contact with the outermost turn of the roll 5b of the photographic film 5 to keep the diameter of the roll 5b small enough to be clamped within the lip 6. The ridges 25 and 26 also serve to reduce friction between the roll 5b and the inside wall of the cassette shell 3 during a photographic film advancement by minimizing the contact surface between the outermost turn of the roll 5b and the shell 3. Finally, the ridges 25 and 26 serve an auxiliary function of preventing the roll 5b from loosening. A passage mouth 27, for passage of the photographic film 5, is defined between the shell halves 3a and 3b. The ridge 26 communicates to a guiding ridge 29 formed inside the passage mouth 27. A separator claw 28 is formed on the lower shell half 3b, which is provided with another guiding ridge connected to the ridge 25. The separator claw 28 abuts a leading end 5a of the photographic film 5, separates it from the inner roll of photographic film 5, and guides it to the passage mouth 27. The guiding ridges assist the separating claw 28 by also directing the leader 5a to the passage mouth 27. A pair of light-trapping ribbons, known as plush in the field of photography, 31 and 32, are disposed in the passage mouth 27 in order to prevent light from entering the roll chamber of the cassette shell 3 through the passage mouth 27.

Assembly of the cassette 2 according to the first preferred embodiment will now be described. At first, the spool 4 is assembled from the spool pieces 4a and 4b. The recesses 22 and 23 are engaged with, and angularly positioned by, jigs. The guide shaft 11 is inserted in the left core 10 through the sleeve 16. The cam follower 12 and the projection 13 fit into and are guided by the recess 18 on the thin portion, and enter the cam groove 17. The projection 13 comes in contact with the back of the claw 17a, but is advanced forcibly while the right spool piece 4a is pressed. The claw 17a is deformed by the projection 13 during advancement so as to allow the guide shaft 11 to advance deeper in the sleeve 16, until the cam follower 12 is received in the cam groove 17. Upon being released from the projection 13, the claw 17a recovers its original shape, and then prevents the projection 13 from moving outward from the claw 17a. The cam follower 12 will thus not become disengaged from the cam groove 17 inadvertently, because the right spool piece 4a cannot move away from the left spool piece 4b. It is therefore unnecessary during the process of manufacturing the cassette 2 to hold the spool 4 to maintain engagement between the spool pieces 4a and 4b in the axial direction.

The trailer 5c is anchored in the slit 21 in the left spool piece 4b. The photographic film 5 is wound on the spool 4 between the flanges 8 and 15. The spool 4 with the photographic film 5 is inserted in the upper shell half 3a and enclosed by covering the lower shell half 3b in light-tight fashion, so as to obtain the assembled cassette 2.

When the cassette 2 is loaded in the camera, the recess 22 in the right spool piece 4a is engaged with the drive shaft 35 of a camera. A film advancing mechanism of the camera rotates the drive shaft 35 in the direction to unwind the film, and thus the right core 9 is rotated clockwise in FIGS. 1 and 2. Rotation of the right core 9 causes the cam edges or ramps 20a to press the cam followers 12 so as to advance the guide shaft 11 further into the left core 10 as illustrated in FIG. 5. Accordingly, the outermost turn of the roll 5b is clamped by the flat flange 15 and the beveled surface of the lip 6. The right core 9 is rotated in the direction of unwinding the photographic film 5 so that the roll 5b is held integrally with both spool pieces 4a and 4b. The outermost turn of the roll 5b thus follows the movement of the spool 4. While the roll is rotated together with the spool 4, the leading end of the leader 5a abuts on the separating claw 28. The left side of the leader 5a is free from the lip 6, so that the leader 5a is separated from the inner roll 5b by the separator claw 28.

Further rotation of the right spool piece 4a then causes the leader 5a to advance to the outside of the cassette shell 3 through the passage mouth 27. The right side 24 of the leader 5a is flexed by contact with the lip 6 while escaping therefrom during the leader advancement.

Figure 6:
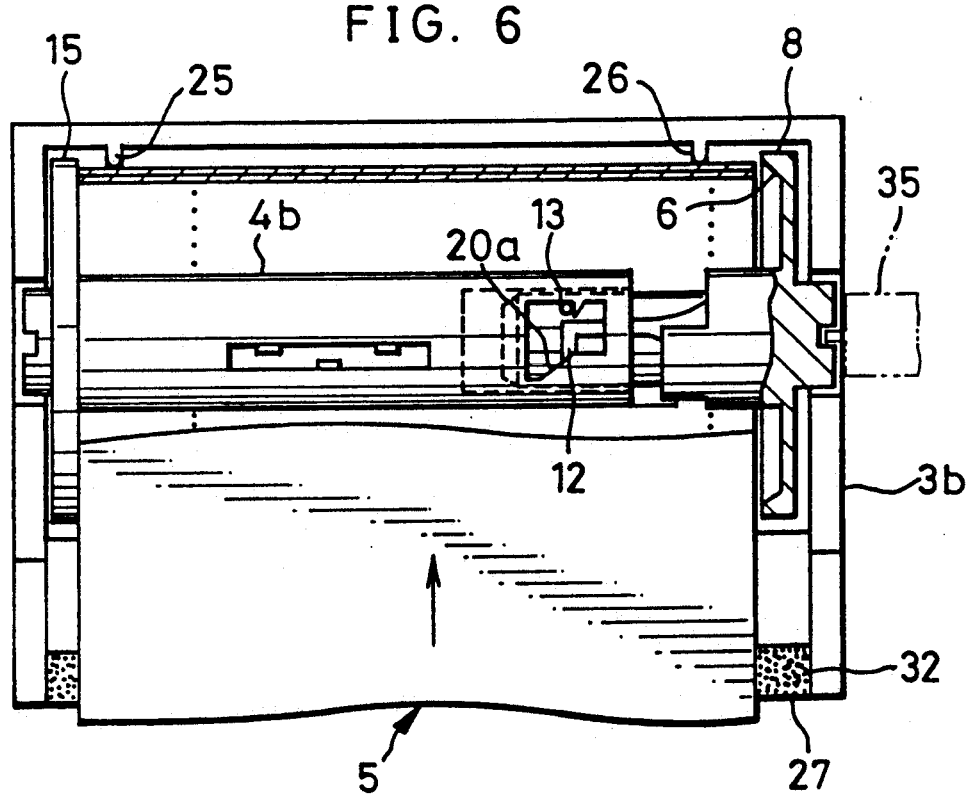
FIG. 6 is a plan view illustrating a winding-up of the photographic film into the cassette.

When all exposures on the photographic film 5 are completed, the drive shaft 35 is reversely rotated. The projection 13 in turn is caused to abut with pressure upon the straight edge 20b opposite to the cam edge 20a. The right spool piece 4a is slid to the right in FIG. 6 to lengthen the spool 4, so that the photographic film 5 is released from being clamped. The photographic film 5 can be wound up by applying only a relatively small torque.

The cam followers 12 have a great resistance to fracture because they are projected from and supported on both the surface of the guide shaft 11 and the end face 9a. Should the cam followers 12 be broken by subjection to an abruptly applied large force, the tongues 9b and 14 are engaged with each other to make it possible to wind up the photographic film 5.

The cassette shell 3 and the spool 4 can be made from metal, plastics or ceramics, of which plastics is most desirable. The cassette shell 3 and the spool 4 can be molded according to injection molding from such plastics as high-impact polystyrene (HIPS) and general purpose polystyrene (GPPS) mixed in the ratio of 3 to 7, in addition to 1% dimethyl polysiloxane KF96 (30,000 centistokes; manufactured by Sinetsu Chemical Co., Ltd.). The mechanical characteristics of this plastic resin are as below:

M.F.R. (ASTM D-1238): 10 g/10 min;
Izod impact strength (ASTM D-256): 2.5 kg/cm$^2$;
Modulus in flexure (ASTM D-790): 30,000 kg/cm$^2$; and
Thermal deformation temperature (ASTM D-648): 80° C.

The spool pieces 4a and 4b may, however, be molded from different materials. The conditions for injection molding is as below:

Molding machine: 50 tf type;
Mold clamping force: 30 tf;
Injection speed: 35 mm/s;
Follow-up pressure: 600 kg/cm$^2$;
Pressure dwell: 4 seconds;
Cooling time: 12 seconds (with water); and
Mold temperature: 180°-200° C.

The photographic film 5 is typically 35 mm wide and 145 μm thick, and is constituted of a based of triacetyl cellulose (TAC) being 122 μm thick with coating of photosensitive emulsion layers.

Tests were conducted as to a torque necessitated for destroying the cam followers 12 and/or the cam grooves 17. The results of these tests are shown in Table 1 in the unit of gf·cm. The destructive torque was measured when the right spool piece 4a has a torque applied thereto while the left spool piece 4b is held immovably. The comparative example was a photographic film cassette as disclosed in U.S. Pat. No. 4,887,776.

TABLE 1

| | Comparative Example | | First Embodiment | |
|---|---|---|---|---|
| | Destructive Torque | Destroyed Portions | Destructive Torque | Destroyed Portions |
| Unwinding Direction | 3700 | Cam Followers | 7800 | Cam Followers |
| Wind-up Direction | 4200 | Cam Grooves | 7800 | Cam Followers |

Figure 7:
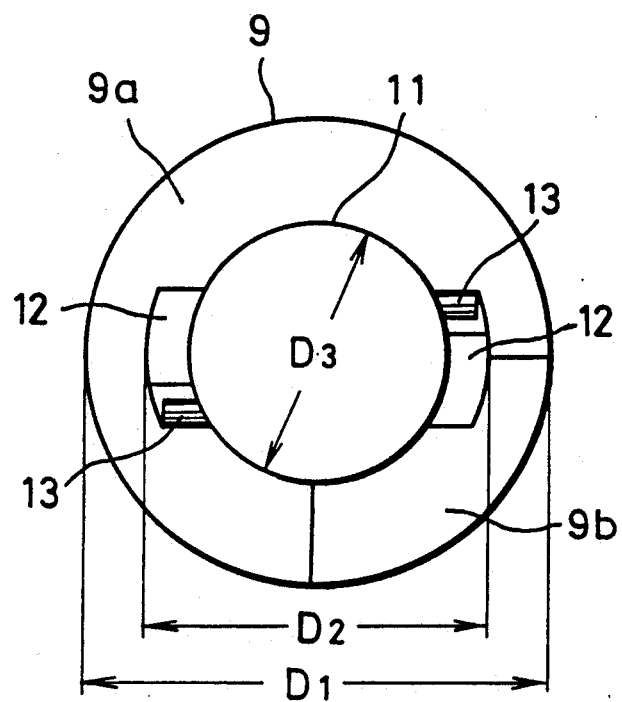
FIG. 7 is a detailed plan view illustrating an important portion of a right-hand spool piece of the spool, as viewed in an axial direction.
Figure 8:
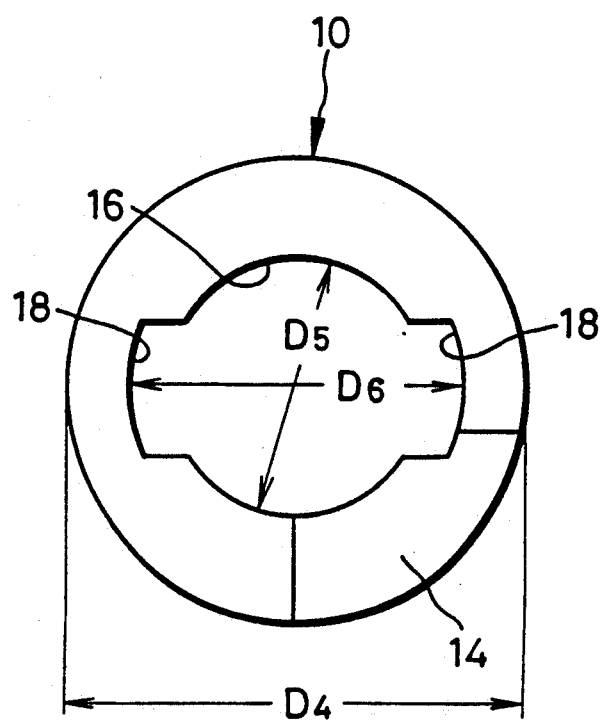
FIG. 8 is a detailed plan view illustrating an important portion of a left-hand spool piece of the spool, as viewed in the axial direction.

The detailed dimension of the spool 4 as illustrated in FIGS. 5, 7 and 8 is as below:

Diameter $D_1$ of the right core 9: 5–13 mm, desirably 7–12 mm;

Distance $D_2$ between the opposite tops of the cam followers 12: 4–13 mm, desirably 5–10 mm;

Diameter $D_3$ of the guide shaft 11: 3–12 mm, desirably 4–9 mm;

Diameter $D_4$ of the left core 10: 5–13 mm, desirably 7–12 mm, which may be equal to $D_1$;

Internal diameter $D_5$ of the sleeve 16: 3–12 mm, desirably 4–9 mm; and

Interval $D_6$ between bottoms of the opposite recesses 18 inside the sleeve 16: 3–12 mm, desirably 4–11 mm.

The above dimensional ranges are rather wide, because the diameter of the cores 9 and 10 is desirably changed according to the length of the film 5 to be wound or a maximum number of photographic frames, so as to maintain the proper clearance between the innermost turn of the roll 5b and the cores 9 and 10 in the state where the photographic film 5 is wholly wound up in the cassette shell 3.

The distance $D_2$ and the interval $D_6$ in mm desirably have a relationship of:

$$-2 \leq D_6 - D_2 \leq 2$$

so as to facilitate insertion of the guide shaft 11 through the sleeve 16. If $D_6 > D_2$, then the cam followers 12 loosely pass through the recesses 18. If $D_6 < D_2$, are caused to flex as they pass into the recesses 18.

Distance $L_1$ between the distal end of the tongue 9b and a flat face of the lipped flange 8: 5–20 mm, desirably 5–10 mm;

Distance $L_2$ between the distal end of the guide shaft 11 and the flat face of the flange 8: 10–25 mm, desirably 10–20 mm; and Distance $L_3$ between the distal end of the tongue 14 and the inside face of the flange 15: 15–35 mm, desirably 25–35 mm.

Figure 9:
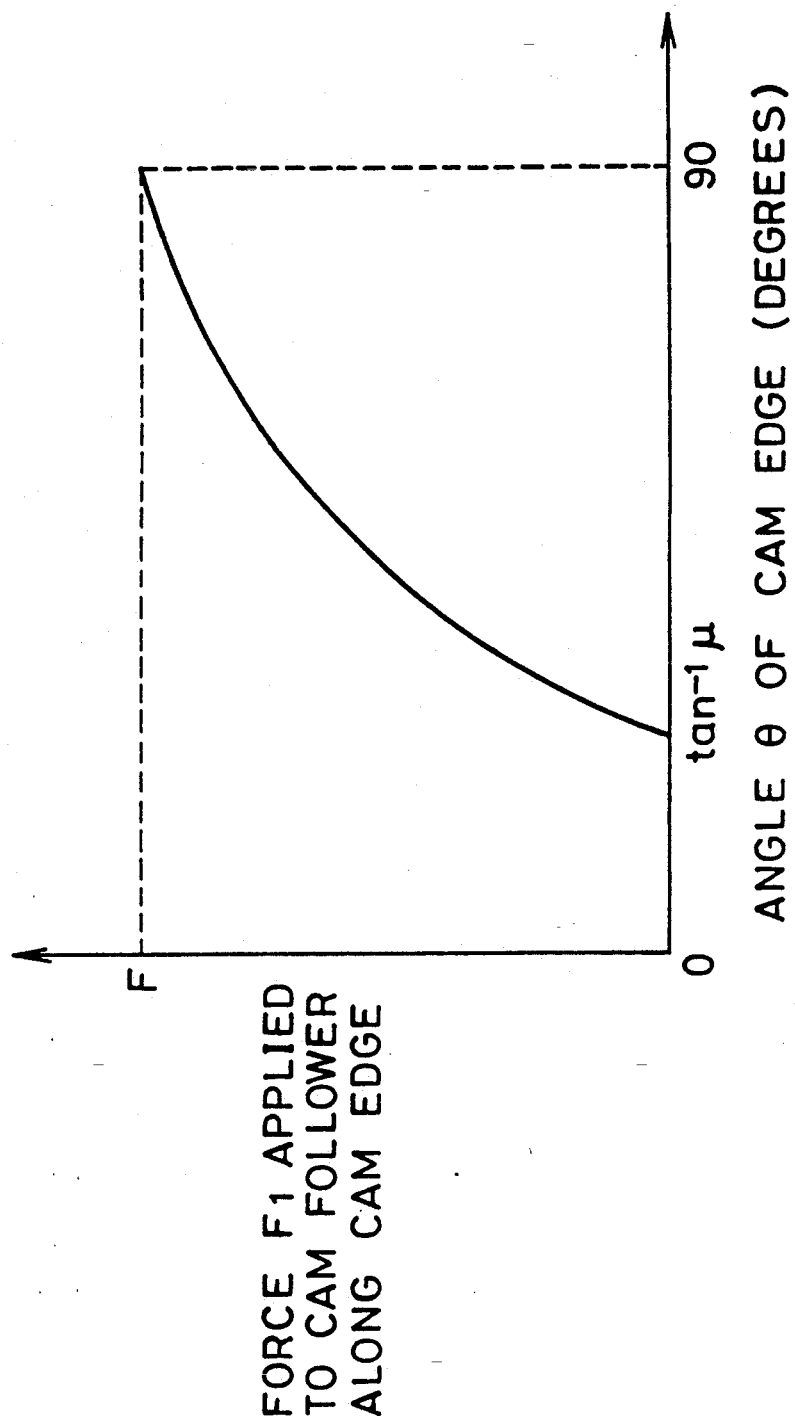
FIG. 9 is a graph illustrating a relationship between a force $F_1$ applied to the cam follower along the cam edge and an angle $\theta$ of the cam edge in the preferred embodiment.
Figure 10:
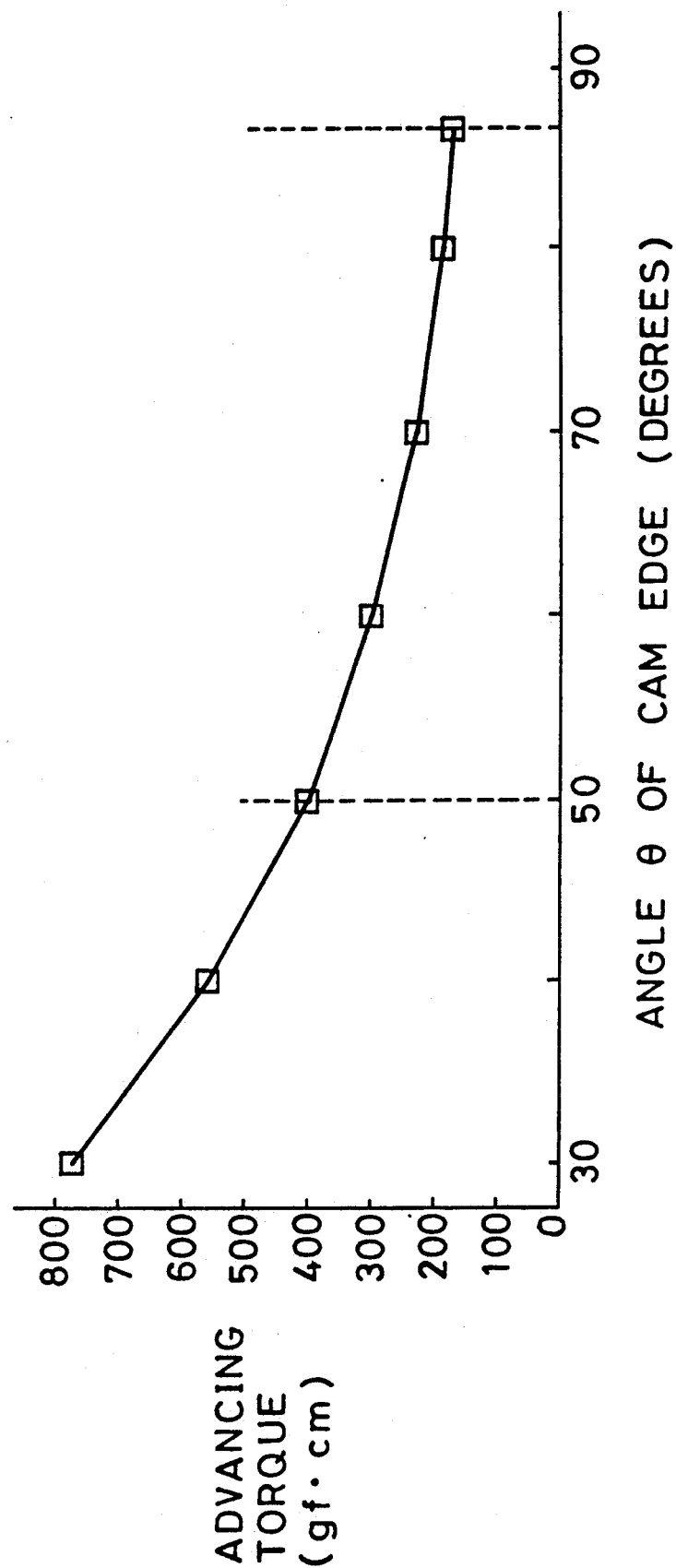
FIG. 10 is a graph illustrating a relationship between an advancing torque and the angle $\theta$ of the cam edge in the preferred embodiment.

The particulars of clamping the photographic film 5 are described now in detail, referring to FIGS. 3, 4 and 9 to 14. Let $\mu$ be a coefficient of friction between the cam follower 12 and the cam edge 20a. When a certain torque is applied to the right core 9 to rotationally apply a force F to the cam follower 12, the force $F_1$ as illustrated in FIG. 4 to advance inward the cam follower 12 along the cam edge 20a is determined as:

$$F_1 = F\sin\theta - \mu F\cos\theta (\geq 0)$$

in which $F\sin\theta$ is a component of F in the direction along the cam edge 20a, and $\mu F\cos\theta$ is a frictional force that the cam edge 20a applies to the cam follower 12. The relationship between $\theta$ and $F_1$ is shown in the graph of FIG. 9 in the range of $0 \leq \theta \leq 90$ in degrees. The greater the angle $\theta$, the greater the force $F_1$, to be more favorable to clamping the photographic film 5.

Figure 11:
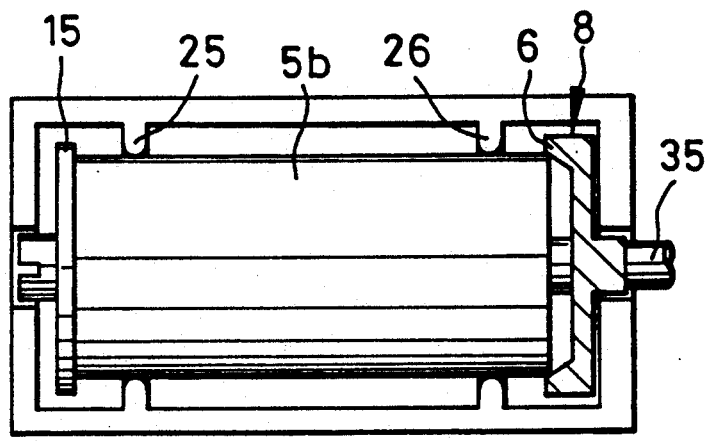
FIG. 11 is a plan view illustrating a state where a roll of the photographic film is free from the spool flanges.
Figure 12:
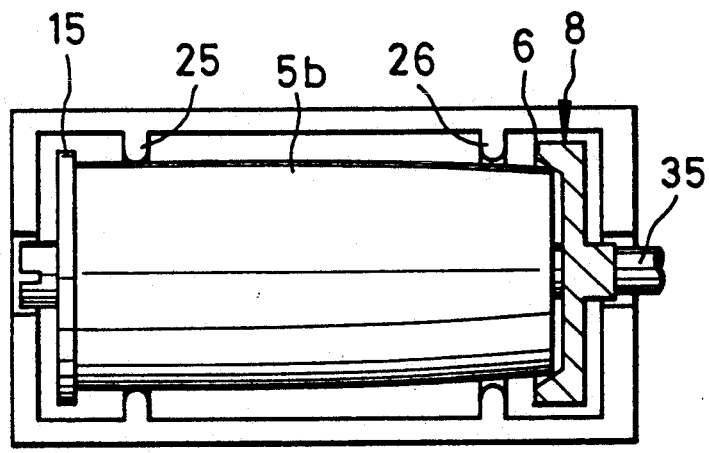
FIG. 12 is a plan view illustrating a manner of clamping the roll when an axial interval between the flanges is shortened.
Figure 13:
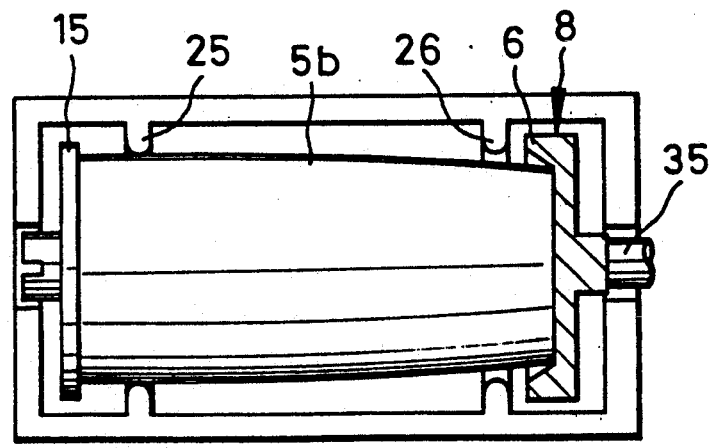
FIG. 13 is a plan view illustrating a manner of clamping the roll when the flange axial interval is at its shortest.

FIGS. 11 to 13 illustrate the relationship of the roll 5b with the flanges 8 and 15. When the roll 5b is clamped slightly as in FIG. 11, the rotary force of the drive shaft 35 of the camera is insufficiently transmitted, so that the outermost turn of the roll 5b is in a highly frictional contact with the annular ridges 25 and 26. When the roll 5b is clamped to a comparatively greater extent as in FIG. 12 or 13, the flanges 8 and 15 transmit the rotary force to the roll 5b. The lip 6 prevents the roll 5b from loosening so as to reduce or avoid the contact of the ridges 25 and 26 with the roll 5b, so that the roll 5b is subjected only to a slight friction to make it reliably possible to advance the leader 5a outward.

It is understood from FIG. 9 that there is a lower limit $\tan^{-1}\mu$ of the cam angle $\theta$, which is known to be 15°. Should the angle $\theta$ be below 15°, the roll 5b could not be clamped, because too large a frictional force would stop the cam followers 12 from sliding along the cam edges 20a. As is understood from FIG. 10, the torque required for a leader advancement decreases accordingly as the angle $\theta$ increases. When $\theta \geq 50$, then the torque is smaller than 400 gf·cm. It is known that 400 gf·cm is a torque which a conventional camera must apply to wind up a photographic film of a conventional 35 mm photographic film cassette. It is advantageous also in the novel cassette 2 to limit the advancing torque to 400 gf·cm in order to lower the load on a motor and a power source of the camera. Should the angle $\theta$, on the other hand, be too great, the cores 9, 10 would need to have a large diameter so as to undesirably enlarge the cassette shell 3. Thus, there is preferable upper limit of the angle $\theta$ of the cam edge, as will be described in detail below.

The extent of slidability between the cores 9 and 10 in the axial direction and the diameter $D_1$ or $D_4$ of the cores 9, 10 are determined as below:

a) The axial slidability of the cores 9, 10 is in the range of 1 mm, because it needs to be at least as long as a height T of the lip 6 from the flat face of the flange 8.

b) The diameter $D_1$ or $D_4$ of the cores 9, 10 is 13 mm or less when the spool 4 is used for the photographic filmstrip 5 of 36 exposures, in consideration of a sufficient strength and a small extent of curling tendency of the roll 5b. It is noted that the cores for a filmstrip of 36 exposures have a diameter smaller than those for a filmstrip of 24 exposures, because in order to maintain the diameter of the cassette shell 3, the core diameter must vary so as to correspond to the length of the photographic film 5.

The cam angle $\theta$ is determined according to the axial slidability and the core diameter. The crosswise circumference of the cores 9, 10 is $13 \cdot \pi$ mm long. Each of the two straight edges 20c need have a range covered by a half of the crosswise circumference, or $13 \cdot \pi \cdot \frac{1}{4}$ mm. The upper limit of the cam angle $\theta$ is determined as an inverse tangent of the half circumference to the axial slidability. Considering that the axial slidability of the cores 9 and 10 is 1 mm, $$\theta_{MAX} = \tan^{-1}\{(13 \cdot \pi \cdot \tfrac{1}{4})/1\} = 87°$$

Should it be desired that the angle $\theta$ be still greater, the core diameter must be over 13 mm.

It is concluded according to the present embodiment that the cam angle $\theta$ can be from 50° to 87° inclusive relative to the axial direction, measured as if the cam groove 17 is projected on a development plane. Note that the angle θ can be from 15° to 90° exclusive, is generally from 40° to 88°, and is preferably from 60° to 85°. Should the angle θ be 90°, there would be no capability of clamping the roll 5b.

Tests were conducted as to relationships between the height T of the lip 6, looseness of the roll 5b and creation of photographic film dust. Photographic film dust is created from the lateral side 24 of the photographic film 5 by frictional contact between it and the lip 6 when the photographic film 5 is advanced outward from the cassette shell 3. Such dust may cause scratches on the photographic film 5 or dust images in photoprints printed from the photographic film 5 on which dust sticks within its image frames. Results of the tests are shown in Table 2. The favorable range of the lip height T is shown with the double solid line, in which the roll 5b was prevented from loosening, and no photographic film dust was created. The extent of creating photographic film dust is indicated such that 1 designates no creation of dust, 2 designates creation of dust rubbed from emulsion layers of the photographic film 5, and 3 designates creation of dust rubbed from both emulsion layers and the base of the photographic film 5.

TABLE 2

| Lip Height T (mm) | 0.1 | 0.2 | 0.3 | 0.4 | 0.5 | 0.6 | 0.7 | 0.8 | 0.9 | 1.0 | 1.1 | 1.2 | 1.3 |
|---|---|---|---|---|---|---|---|---|---|---|---|---|---|
| Looseness of Roll 5b | Existed | None | None | None | None | None | None | None | None | None | None | None | None |
| Dust Creation | 1 | 1 | 1 | 1 | 1 | 1 | 1 | 1 | 1 | 1 | 2 | 2 | 2 |

Figure 14:
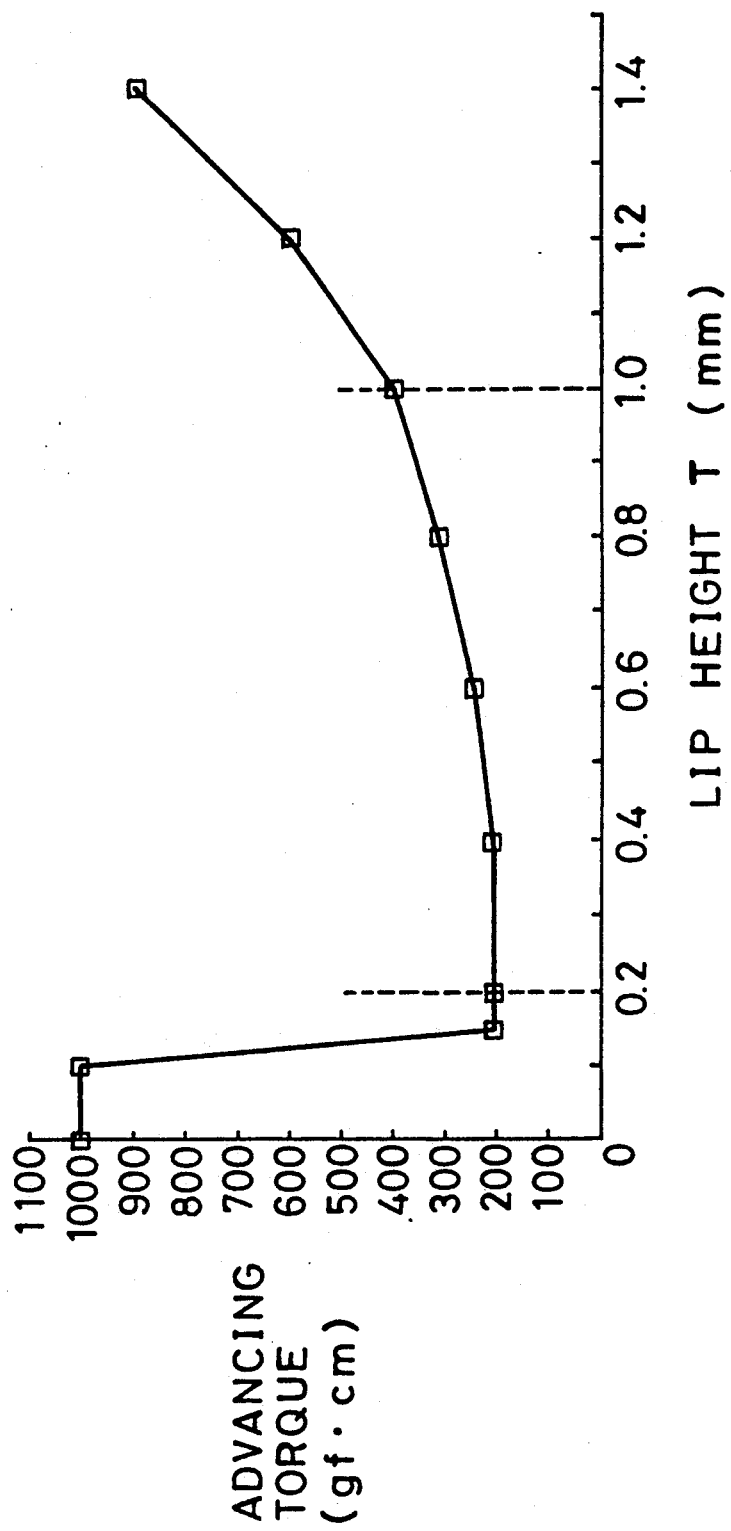
FIG. 14 is a graph illustrating a relationship between the advancing torque and a height T of a lip of a first flange in the preferred embodiment.

The advancing torque was also measured relative to the lip height T and is shown in FIG. 14. When $T<0.2$ in mm, the lip 6 has no adaptability to reducing looseness of film roll, so that the lateral side 24 of the photographic film 5 wraps around the flange 8. High friction between the photographic film 5 and the ridges 25 and 26 raised the torque for leader advancement exceedingly. When $T \geq 0.2$, the advancing torque decreases sharply because the lip 6 operates to prevent the roll 5b from loosening. While the lip height T increases further over 0.2, the advancing torque increases accordingly thereto, as the lateral side 24 is deformed to a large extent by being rubbed on the lip 6. When $T>1.0$, the advancing torque is over 400 gf·cm. The optimum lip height T is concluded to be from 0.2 to 1.0 mm.

Figure 15:
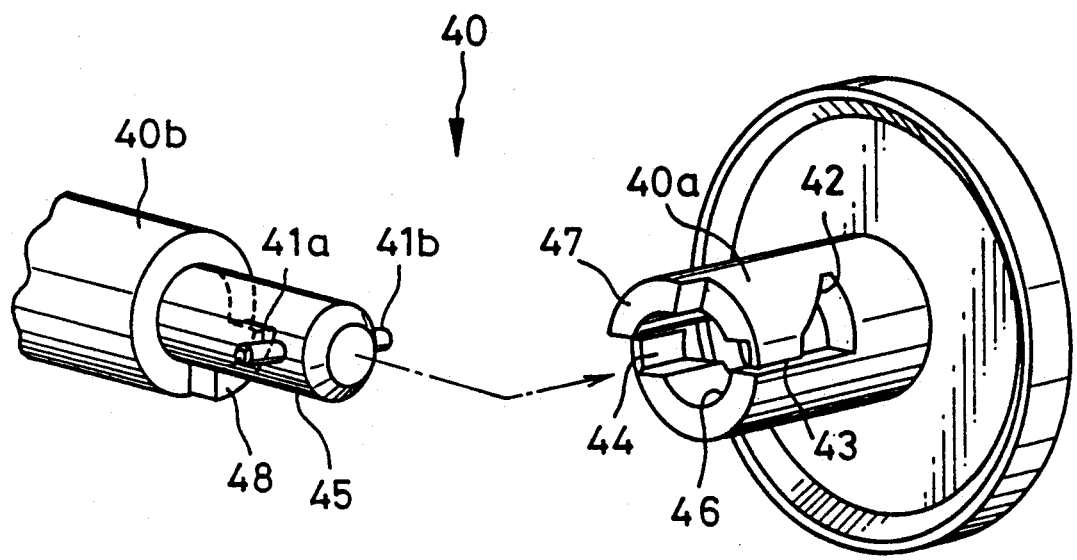
FIGS. 15 to 18 are exploded perspective views illustrating an important portion of spools of improved cassettes according to additional preferred embodiments of the present invention.

FIG. 15 illustrates a second preferred embodiment wherein spool pieces of a shortenable spool 40 are prevented from being disengaged inadvertently and wherein the photographic film can be wound up even when a cam mechanism is broken. A left core 40b has a guide shaft 45, on which cam followers 41a and 41b are formed as bars. Cam grooves 42 in a right core 40a to be rotated by the drive shaft 35 are open to a core end in the axial direction through slits 43. Proximate the communicative slits 43, therein portions 44 are formed in core 40a so as to be flexible against the cam followers 41a and 41b. When the guide shaft 45 is inserted in a sleeve 46 in the right core 40a, the cam followers 41a and 41b are slid while they deform the thin portions 44 outward, and finally arrive in the cam grooves 42. Upon the cam grooves 42 receiving the cam followers 41a and 41b, the thin portions 44 recover their original forms so that the cam followers 41a and 41b are prevented from slipping out of the cam grooves 42. Thus, there is no need for simultaneously supporting both spool pieces in the following manufacturing processes. Reference numerals 47 and 48 designate tongues similar to the tongues similar to the tongues 9b and 14 of the first embodiment.

Figure 16:
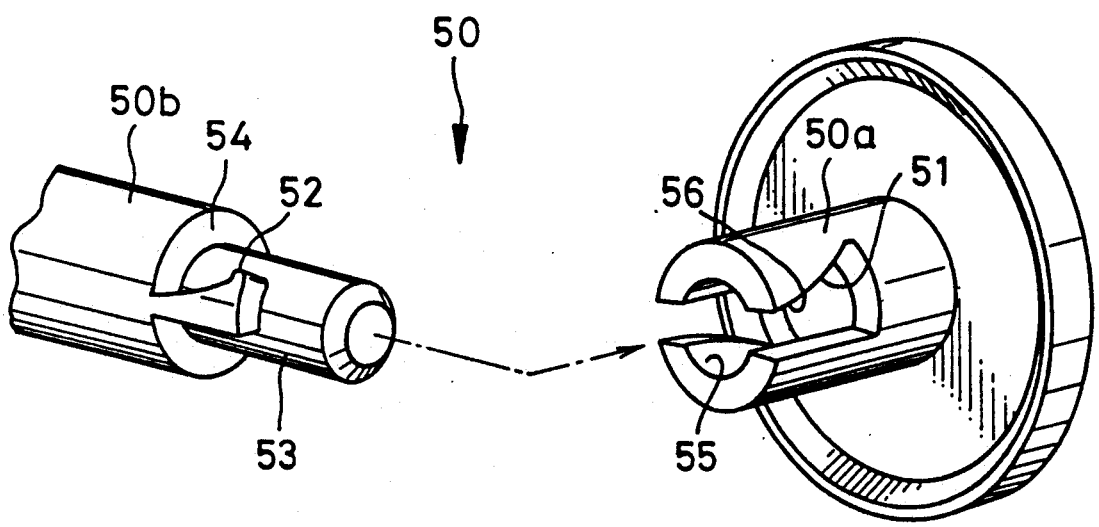

FIG. 16 illustrates a shortenable spool 50 according to a third preferred embodiment. A right core 50a not be driven by the drive shaft 35 has cam grooves 51, in which cam followers 52 of a left core 50b are received. The cam followers 52 are formed not only on a guide shaft 53 but also on a stepped wall 54, so as to be strong enough to have a high resistance to fracture. The right end of each cam follower 52 is wider than, and is elastically held in, narrow openings 56 communicating with the cam grooves 51. Accordingly, the guide shaft 53 is prevented from being inadvertently slipping out of sleeve 55.

Figure 17:
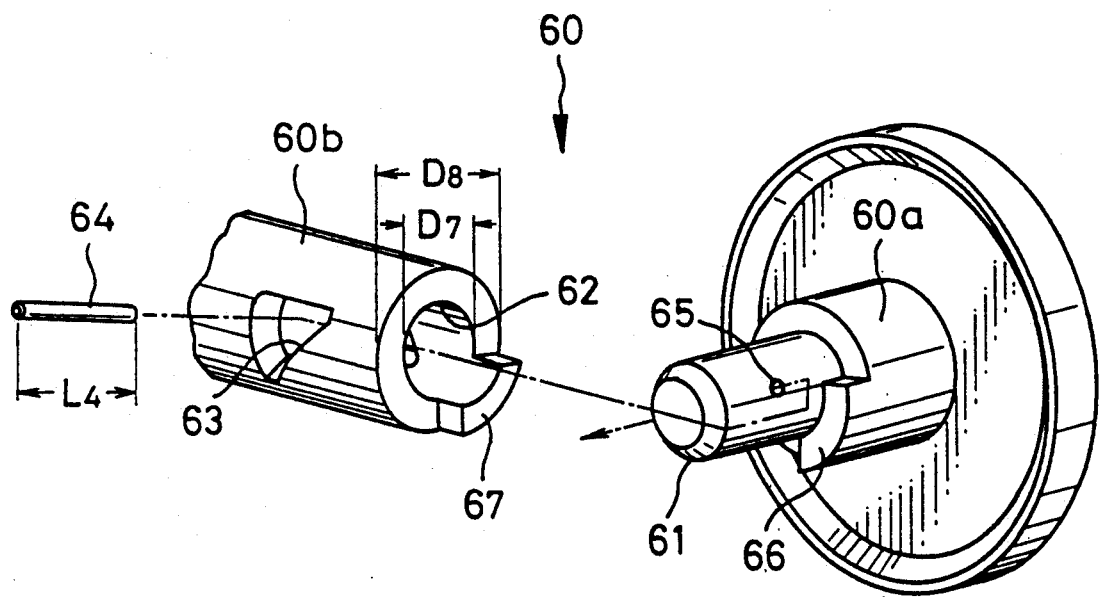

FIG. 17 illustrates a shortenable spool 60 according to a fourth preferred embodiment. A left core 60b has a sleeve 62, in which cam grooves 63 are formed so as to be closed to the end of sleeve 62 which does not have a thin portion, and thus has a high resistance to fracture. A right core 60a to be driven by the drive shaft 35 has a guide shaft 61. After inserting the guide shaft 61 into the sleeve 62 in the left core 60b, a follower pin 64 is fitted through a hole 65 via the cam grooves 63 so as to constitute a pair of cam followers. Preferable materials for the follower pin 64 are metal such as stainless steep SUS303 and SUS304, carbon steel S30C, S45C and S55C for machine structural use, brass C3602 and C3604, phosphor bronze C5191 and C5441, and aluminum alloy A5056. The stainless steel SUS303 and SUS304 are the most preferable. Tongues 66 and 67 are formed on the cores 60a and 60b to engage them together as the pin 64 might be broken or slip away otherwise. Let the pin 64 be $L_4$ long. Let $D_7$ be an internal diameter of the sleeve 62. Let the left core 60b be $D_8$ across. The pin 64 is formed to be $D_7 < L_4 < D_8$. The cam followers are thus reliably engaged with edges of the cam groove 63 so that the cores 60a and 60b are prevented from inadvertent disengagement. The cam followers are flush with or retracted from the outside of the core 60b so that the pin 64 will scratch, or otherwise interfere with, the photographic film 5.

Figure 18:
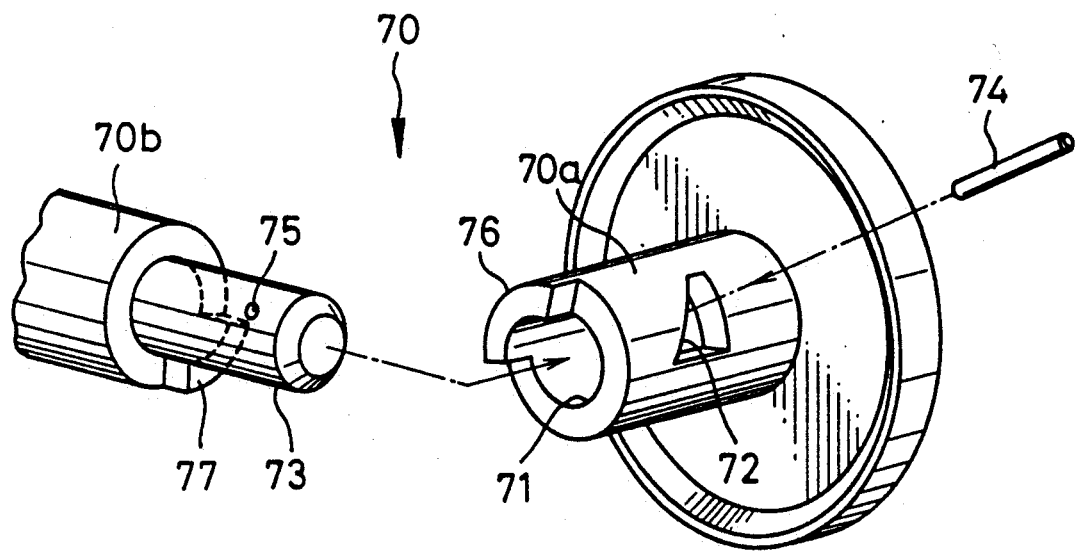

FIG. 18 illustrates a shortenable spool 70 according to a fifth preferred embodiment. A right core 70a to be driven by the camera has a sleeve 71 and cam grooves 72, while a left core 70b has a guide shaft 73. This construction is inverse to FIG. 17, but otherwise similar thereto. Follower pin 74, hole 75, and tongues 76 and 77 are also provided in a manner similar to the fourth embodiment.

The novel spool as above can be made from thermoplastic resin, thermoset resin, metal, ceramics or the like. Resin is the most desirable in view of its adaptability to mass production and low cost. The resin is preferably thermoplastic resin, which is inexpensive and adaptable to injection molding, such as polystyrene resin (HIPS resin including rubber, among others), ABS resin, and polyolefin resin (high-density polyethylene resin, homopolypropylene resin, propylene/alpha olefin random copolymer resin, propylene/alpha olefin block copolymer resin, among others). Of course, the material should include a light-shielding material or light screen as a component, such as carbon black pigments, black dye, metallic power, aluminum paste, and the like.

Most desirably, the spool is constructed of a material of which the main component is a polyblend of HIPS resin and polypropylene resin (e.g., homopolypropylene resin, propylene/ethylene random copolymer resin, and propylene/ethylene block copolymer resin), or a polyblend of at least two of the polypropylene resin, ethylene copolymer resin, and rubber. The two spool pieces may be molded from different materials.

Thermoplastic resins that are adaptable to injection molding are not limited to the above-mentioned examples, but can be added to the resin in order to provide desirable characteristics, such as enlarging injection capacity and preventing deterioration.

It is preferable, for purposes of preventing troubles due to static electricity, to add to the resin a conductive material, such as:
1) Nonionic surface active agent (whose main component is polyoxyethylene glycol);
2) Anion surface active agent (whose main component is polyoxyethylene glycol);
3) Cation surface active agent (whose main component is quaternary ammonium salt);
4) Ampholytic surface active agent;
5) Alkyl amine derivative;
6) Aliphatic acid derivative;
7) Several kinds of lubricant;
8) Carbon black, and graphite;
9) Metallic surface coating pigment;
10) Metallic powder, and metallic flake;
11) Carbon fiber;
12) Metallic fiber; and
13) Whisker (potassium titanate, alumina nitride, and alumina).

The examples of the nonionic surface active agents are polyethylene glycol fatty ester, polyoxyethylene sorbitan fatty ester, polyoxyethylene fatty alcohol ether, polyoxyethylene alkyl phenyl ether, polyoxyethylene glycerin fatty ester, polyoxyethylene fatty amine, sorbitan mono fatty ester, fatty acid pentaerythritol, fatty alcohol ethylene oxide adduct, fatty acid ethylene oxide adduct, adduct of fatty amino or fatty amide to ethylene oxide, alkylphenol ethylene oxide adduct, alkyl naphthol ethylene oxide adduct, adduct of fatty partial ester of polyvalent alcohol to ethylene oxide, and several kinds of antistatic agents described in Japanese Patent Publication No. 63-26697, page 120.

Examples of the above-mentioned anionic surface active agents are sodium salt of ricinoleic acid sulfur ester, various metallic salts of fatty acid, sodium salt of sulfur ester of ricinoleic acid ester, sulfonated oleic acid ethylaniline, salts of sulfur ester of olefin, sodium salt of oleyl alcohol sulfur ester, salt of alkyl sulfonate, fatty acid ethyl sulfonate, alkyl sulfonate, alkyl naphthalate sulfonate, alkyl benzene sulfonate, succinate ester sulfonate, and salt of phosphoric acid ester.

Examples of the cation surface active agents are primary amine salt, tertiary amine salt, quaternary ammonium salt, and pyridine derivative.

Examples of the ampholytic surface active agents are carboxylic acid derivative, imidazoline derivative, and betaine derivative.

An antistatic agent or conductive material is preferably added at an amount of 0.01 to 3.0 percent by weight.

A good example of a light screen or light-shielding material added to the resin for shielding the spool from light is the inorganic compound as referred to below.
1) Oxide, such as: silica, diatomaceous earth, alumina, titanium oxide, iron oxide, zinc oxide, magnesium oxide, antimony oxide, barium ferrite, strontium ferrite, beryllium oxide, pumice stone, pumice stone balloon, and alumina fiber.
2) Hydroxide, such as: aluminum hydroxide, magnesium hydroxide, and basic magnesium carbonate.
3) Carbonate, such as: calcium carbonate, magnesium carbonate, dolomite, and danalite.
4) Sulfate and sulfite, such as: calcium sulfate, barium sulfate, ammonium sulfate, and calcium sulfite.
5) Silicate, such as: talc, clay, mica, asbestos, glass fiber, glass balloon, glass bead, calcium silicate, montmorillonite, and bentonite.
6) Carbon, such as: carbon black, graphite, carbon fiber, and carbon hollow sphere.
7) Other compounds, such as iron powder, copper powder, lead powder, aluminum powder, molybdenum sulfide, boron fiber, silicon carbide fiber, brass fiber, potassium titanate, lead titanate zirconate, zinc borate, barium metaborate, calcium borate, sodium borate, and aluminum paste.

Carbon black is the most preferable, because it has little influence on the photographic film 5, a great capacity for shielding light, and is inexpensive. Carbon black is classified according to raw materials as gas black, furnace black, channel black, anthracene black, Ketchen carbon black, thermal black, lamp black, oil smoke, pine smoke, animal black, and vegetable black.

Among the above, furnace black is preferable because of its light-shielding capacity, low cost and high quality. Acetylene black, and Ketchen carbon black being a denatured by-product, are preferable because of their light-shielding capacity as well as antistatic properties. However, these antistatic types of carbon black can be relatively expensive. Different types of carbon black can be mixed in accordance with desired properties. Among several methods of composing polyethylene polymer with light-shielding material, the master batch method is preferable because of low cost and minimal environmental problems associated with production.

It is desirable to add lubricant to the resin at an amount from 0.01 to 5.0 percent by weight to improve extrudability in injection and to prevent the buildup of static electricity. A lubricant of fatty acid amide type can be added at 0.01 to 1.0 percent by weight because it tends to bleed out though its lubricant properties are high.

Examples of lubricants that are harmless to the photographic film 5, available in the market, are referred to below, as well as manufacturers thereof.
1) Silicone lubricants: dimethytl polysiloxane of various grades and denaturation thereof (manufactured by Sinetsu Chemical Co., Ltd, and Toray Silicone Co., Ltd.), etc.
2) Oleic acid amide lubricants; ARMO SLIP-CP (trade name; manufactured by Lion Akzo Co., Ltd.), NEWTRON (trade name; manufactured by Nippon Fine Chemical Co., Ltd.), AMIDE-O (trade name; manufactured by Nitto Chemical Industry Co., Ltd.), AL- FLOW E-10 (trade name; manufactured by Nippon Oil and Fats Co., Ltd.), DIAMID O-200 (trade name; manufactured by Nippon Kasei Chemical Co., Ltd.), DIAMID G-200 (trade name; manufactured by Nippon Kasei Chemical Co., Ltd.), etc.
3) Erucic acid amide lubricants: ALFLOW P-10 (trade name; manufactured by Nippon Oil and Fats Co., Ltd.), etc.
4) Stearic acid amide lubricants: ALFLOW S-10 (trade name; manufactured by Nippon Oil and Fats Co., Ltd.), NEWTRON 2 (trade name; manufactured by Nippon Fine Chemical Co., Ltd.), DIAMID 200 (merchandise name; manufactured by Nippon Kasei Chemical Co., Ltd.), etc.
5) Bis fatty acid amide lubricants: BISAMIDE (trade name; manufactured by Nitto Chemical Industry Co., Ltd.), DIAMID 200 BIS (trade name; manufactured by Nippon Kasei Chemical Co., Ltd.), ARMO WAX-EBS (trade name; manufactured by Lion Akzo Co., Ltd.), etc.
6) Alkyl amine lubricants: ELECTROSTRIPPER TS-2 (trade name; manufactured by Kao Corporation), etc.
7) Hydrocarbon lubricants: liquid paraffin, natural paraffin, micro wax, synthetic paraffin, polyethylene wax, polypropylene wax, chlorinated hydrocarbon, fluorocarbon, etc.
8) Fatty acid lubricants: higher fatty acid (those preferable number of carbon atoms is $C_{12}$ or more), oxy fatty acid, etc.
9) Ester lubricants: fatty acid lower alcohol ester, fatty acid polyvalent alcohol ester, fatty acid polyglycol ester, fatty acid fatty alcohol ester, etc.
10) Alcohol lubricants: polyvalent alcohol, polyglycol, polyglycerol, etc.
11) Metallic soaps: compounds of higher fatty acids such as lauric acid, stearic acid, ricinoleic acid, naphthenic acid and oleic acid and metals such as Li, Mg, Ca, Sr, Ba, Zn, Cd, Al, Sn and Pb, etc.

Examples of additives which may be added as required to the resin for forming the spool are referred to below. Naturally, the additives to be used are not limited to these examples but can be any known kind and depend upon the properties desired.
1) Plasticizer: phthalate ester, glycol ester, fatty acid ester, phosphate ester, etc.
2) Stablizer: lead type, cadmium type, zinc type, alkali earth metal type, organo-tin type, etc.
3) Flame retardant: phosphate ester, halogenated phosphate ester, halide, inorganic matters, phosphorus-containing polyol, etc.
4) Filler: alumina, kaolin, clay, calcium carbonate, mica, talc titanium oxide, silica, etc.
5) Reinforcer: glass roving, metal fiber, glass fiber, milled glass fiber, carbon fiber, etc.
6) Foaming agent: inorganic foaming agents (ammonium carbonate and sodium bicarbonate), organic foaming agents (nitroso type and azo type), etc.
7) Vulcanizer: vulcanizing accelerator, supplement accelerator, etc.
8) Deterioration inhibitor: ultraviolet light absorber, metal inactivation agent, peroxide decomposer, etc.
9) Coupling agent: silane type, titanate type, chrome type, aluminum type, etc.
10) Various thermoplastic resins, rubber, etc.
11) Nucleator: organic nucleator (dibenzylidene sorbitol compound), inorganic nucleator (calcium carbonate), etc.

Although the present invention has been fully described by way of the preferred embodiments thereof with reference to the accompanying drawings, various changes and modifications will be apparent to those having skill in this field. Therefore, unless otherwise these changes and modifications depart form the scope of the present invention, as defined by the appended claims, they should be construed as included therein.

What is claimed is:

1. A photographic film cassette having a spool with a photographic film wound in a roll thereon and a cassette shell for rotatably containing said spool, said spool being rotated in a film unwinding direction to cause a leader of said photographic film, rotating together with said spool, to advance to an outside of said cassette shell through a passage mouth formed in said cassette said spool including first and second spool pieces, said first spool piece including a first flange and a first core, a first end of said first core being supported by said cassette shell in a cantilever fashion, said second spool piece includes a second flange and a second core, a third end of said second core being supported by said cassette shell in a cantilever fashion, a fourth end of said second core, which is opposite to said third end, being associated with a second end of said first core, which is opposite said first end, said cassette comprising:

a guide shaft formed on said second end of said first core to be coaxial with said first core, said guide shaft having a crosswise diameter which is smaller than a crosswise diameter of said first core;

a sleeve formed on said fourth end of said second core, said guide shaft being inserted into said sleeve for allowing said spool to change between lengthened and shortened states by relative axial movement of said first and second spool pieces, lateral edges of said roll of said photographic film being clamped between said first and second flanges when said spool assumes said shortened state, said lateral edges being released from clamping by said first and second flanges when said spool assumes said lengthened state;

a cam follower projecting from said guide shaft;

a cam groove formed in said fourth end of said second core so as to receive said cam follower therein, said cam groove causing said spool to change from said lengthened state to said shortened state, by virtue of engagement with said cam follower, when said spool is rotated in said film unwinding direction, said first and second flanges clamp said lateral edges of said roll so as to advance said leader outward from said cassette shell when said spool is rotated in said film unwinding direction, said cam groove causing said spool to change from said shortened state to said lengthened state, by virtue of engagement with said cam follower, when said spool is rotated in a wind-up direction which is opposite to said film unwinding direction, said cam groove being closed to said fourth end; and a recess formed inside said sleeve, said cam follower being inserted through said recess into said cam groove.

2. A photographic film cassette as defined in claim 1, wherein said cassette shell includes a pair of resinous shell halves.

3. A photographic film cassette as defined in claim 2, wherein a base portion of said cam follower is flexible.

4. A photographic film cassette as defined in claim 3, wherein said cam groove is shaped so that when said first spool piece is initially rotated in said film unwinding direction, said spool changes from said lengthened state to said shortened state by sliding relative to said second spool piece, and subsequently, said first and second spool pieces rotate integrally with each other while maintaining said shortened state.

5. A photographic film cassette as defined in claim 4, wherein said cam follower projects from said guide shaft and from said first core and extends in an axial direction of said spool.

6. A photographic film cassette as defined in claim 5, wherein said cam groove has a cam edge inclined relative to said axial direction, said cam edge being adapted to contact with said cam follower when said first spool piece is rotated in said film unwinding direction relative to said second spool piece.

7. A photographic film cassette as defined in claim 6, further comprising:
 a second cam follower formed on said guide shaft so as to be rotationally symmetrical to said cam follower; and
 a second cam groove formed in said fourth end so as to be rotationally symmetrical to said cam groove.

8. A photographic film cassette as defined in claim 7, further comprising:
 an auxiliary linkage associated with said second and fourth ends so as to engage said two spool pieces together when said cam follower or said cam groove is broken, said auxiliary linkage transmitting rotation of said first spool piece to said second spool piece so as to enable rotation of said spool to transport said photographic film 9. A photographic film cassette as defined in claim 8, wherein a trailer of said photographic film is attached to said second core, and said auxiliary linkage includes a first tongue formed to project from said second end in a direction alongside said axial direction so as to extend over a part of the circumference of said guide shaft, and a second tongue formed to project from said fourth end in a direction alongside said axial direction so as to be in engagement with said first tongue.

10. A photographic film cassette as defined in claim 9, further comprising:
 a disengagement preventing device associated with said second and fourth ends for preventing said spool pieces from being disengaged from each other in said axial direction when said cam follower is inserted in said cam groove.

11. A photographic film cassette as defined in claim 10, wherein said cam groove has a second edge disposed opposite to said cam edge for receiving said cam follower to allow said cam follower to retract when said first spool piece rotates in said wind-up direction relative to said second spool piece, and said disengagement preventing device includes a first projection formed on said guide shaft and being adapted to be received in said cam groove, and a second projection formed on said second edge of said cam groove for engagement with said first projection in order to prevent said first projection from moving beyond said second projection in a direction corresponding to a lengthening of said spool.

12. A photographic film cassette as defined in claim 11, further comprising:
 a circumferential lip formed on a peripheral edge of said first flange so as to project toward said roll in order to come into contact with a first edge of two lateral edges of said outermost turn of said roll, and adapted for cooperation with said second flange so as to tightly clamp said lateral edges of said outermost turn of said roll so as to prevent said roll from loosening when said spool takes said shortened state, said second flange being flat; and
 a separator claw formed in said cassette for separating said leader from said roll while said roll rotates in said film unwinding direction together with said spool.

13. A photographic film cassette having a spool with a photographic film wound in a roll thereon and a cassette shell for rotatably containing said spool, said spool being rotated in a film unwinding direction so as to cause a leader of said photographic film, rotating together with said spool, to advance to an outside of said cassette shell through a passage mouth formed in said cassette shell, said spool including first and second spool pieces, said first spool piece including a first flange and a first core, a first end of said first core being supported by said cassette shell in a cantilever fashion, said second spool piece including a second flange, and a second core, a third end of said second core being supported by said cassette shell in cantilever fashion, a fourth end of said second core, which is opposite to said third end, being associated with a second end of said first core, which is opposite said first end, said cassette comprising:
 a guide shaft formed on said second end of said first core so as to be coaxial with said first core, said guide shaft having a diameter which is different from a diameter of said first core;
 a sleeve formed on said fourth end of said second core, said guide shaft being inserted into said sleeve for allowing said spool to change between lengthened and shortened states by relative sliding of said two spool pieces, lateral edges of said roll of said photographic film being clamped between said first and second flanges when said spool assumes said shortened state, said lateral edges being released from clamping between said first and second flanges when said spool assumes said lengthened state;
 a cam follower projecting from a cylindrical surface of said guide shaft and from said first core, said cam follower extending in an axial direction of said spool and being flexible;
 a cam groove formed in said fourth end of said second core for receiving said cam follower, said cam groove causing said spool to change from said lengthened state to said shortened state, by virtue of engagement with said cam follower, when said spool is rotated in said film unwinding direction, so as to cause said first and second flanges to clamp said lateral edges of said roll and so as to advance said leader outward from said cassette shell, said cam groove causing said spool to change from said shortened state to said lengthened state, by virtue of engagement with said cam follower, when said spool is rotated in a wind-up direction which is opposite to said film unwinding direction.

14. A photographic film cassette as defined in claim 13, wherein said cam groove is formed so that when said first spool piece is initially rotated in said film unwinding direction, said spool changes from said lengthened state to said shortened state by relative sliding of said two spool pieces, and subsequently, said first and mechanism causing said spool to change from said shortened state to said lengthened state when said spool is rotated in a wind-up direction which is opposite to said film unwinding direction, said cam mechanism comprising a cam follower formed on said second end and a cam groove formed in said fourth end for receiving said cam follower; and a disengagement preventing device so as to prevent said spool pieces from being disengaged from each other in an axial direction of said spool when said spool pieces are assembled together, said disengagement preventing device comprising a first projection formed on said second end and adapted to being received in said cam groove and a second projection formed on an edge of said cam groove opposite to a cam edge of said cam groove so as to come into contact with said first projection in order to prevent said first projection from moving beyond said second projection in a direction corresponding to a lengthening of said spool.

25. A photographic film cassette as defined in claim 24, wherein said slide allowing means includes a guide shaft formed on said second end of said first core to be coaxial with said first core, and a sleeve formed on said fourth end of said second core, said guide shaft being inserted into said sleeve and when said first spool piece is initially rotated in said film unwinding direction, said spool changes from said lengthened state to said shortened state by a relative slide of said two spool pieces due to engagement between said cam follower and said cam groove, and subsequently, said first and second spool pieces rotate integrally with each other while maintaining said shortened state.

26. A photographic film cassette as defined in claim 25, wherein said cam follower is formed integrally with said second end.

27. A photographic film cassette as defined in claim 26, wherein said disengagement preventing device comprises:

a first projection formed on said guide shaft and adapted to being received in said cam groove; and a second projection formed on an edge of said cam groove opposite to a cam edge of said cam groove so as to come into contact with said first projection in order to prevent said first projection from moving beyond said second projection in a direction corresponding to a lengthening of said spool.

28. A photographic film cassette as defined in claim 25, wherein said cam follower is of a pin which is attached to said second end, said pin having a strength which is higher than that of said second end, said pin also constituting said first projection of said disengagement preventing device, said pin extends through said second end and further constitutes a second cam follower formed so as to be rotationally symmetrical to said cam follower, and a second cam groove is formed so as to be rotationally symmetrical to said cam follower, and a second cam groove is formed in said fourth end so as to be rotationally symmetrical to said cam groove.

29. A photographic film cassette as defined in claim 24, wherein a slit is formed so as to communicate said cam groove with said fourth end, said slit extending from an outside to an inside of said sleeve and having a width which is smaller than a width of said cam follower, a thin portion being formed on said fourth end along said slit by a recess in an inside of said sleeve, said thin portion being flexed when said cam follower is inserted into said cam groove through said slit, and said cam follower constituting said disengagement preventing device.

30. A photographic film cassette as defined in claim 24, wherein a narrow opening is formed so as to communicate said cam groove with said fourth end, said opening extending from an outside to an inside of said sleeve, and having a width smaller than a width of said cam follower, and said cam follower is inserted into said cam groove through said narrow opening while flexing edges of said narrow opening, said cam follower constituting said disengagement preventing device.

31. A photographic film cassette as defined in claim 24, wherein said cam follower is a pin which is attached to said second end, said pin having a strength which is higher than said second end, said pin also constituting said disengagement preventing device, said pin extending through said second end so as to further constitute a second cam follower disposed rotationally symmetrical to said cam follower and a second cam groove is disposed rotationally symmetrical to said cam groove.

32. A photographic film cassette having a spool with a photographic film wound in a roll thereon between first and second flanges of said spool and a cassette shell for rotatably containing said spool, said spool being constituted of a first spool piece including said first flange and a first core, and a second spool piece including said second flange and a second core, when said spool is rotated in a film unwinding direction, said first and second flanges move toward each other for clamping a roll of said photographic film therebetween so as to rotate said roll together with said spool, a leader of said photographic film being caused to advance to an outside of said cassette shell through a passage mouth of said cassette film by virtue of rotation of said spool of said cassette comprising:

a guide shaft projecting from an end of said first core;

a sleeve formed on an end of said second core, said guide shaft being rotatably fitted in said sleeve;

a cam follower formed on said guide shaft;

a cam groove formed in an intermediate portion of said sleeve so as to cooperate with said cam follower to bring said first and second flanges relatively close to each other when said one of said first and second spool pieces is rotated in said film unwinding direction; and a recess formed on an inside surface of said sleeve to communicate with said cam groove and an end of said sleeve, said recess being adapted to receive said cam follower so as to allow insertion of said cam follower into said cam groove when said guide shaft is fitted in said sleeve.

33. A photographic film cassette as defined in claim 32, wherein said cam follower extends to said end of said first core.

34. A photographic film cassette as defined in claim 33, wherein a pair of projections are formed respectively on end faces of said first and second cores so as to cause said first and second spool pieces to rotate together by virtue of engagement between said projections when cooperation between said cam follower and said cam groove is eliminated due to breakage of one of said cam follower and said cam groove.

35. A photographic film cassette as defined in claim 34, further comprising means for preventing said guide shaft from being disengaged from said sleeve after said cam follower is inserted in said cam groove.

second spool pieces rotate integrally with each other while maintaining said shortened state.

15. A photographic film cassette as defined in claim 14, wherein said cam groove is closed to said fourth end.

16. A photographic film cassette as defined in claim 13, wherein a narrow opening is formed to communicate said cam groove to said fourth end and extending from an outside to an inside of said sleeve, said narrow opening being adapted to allow insertion of said cam follower into said cam groove.

17. A photographic film cassette having a spool with a photographic film wound in a roll thereon and a cassette shell for rotatably containing said spool, said spool being rotated in a film unwinding direction so as to cause a leader of said photographic film, rotating together with said spool, to advance to an outside of said cassette shell through a passage mouth formed on said cassette shell, said spool including a first flange and a first core, a first end of said first core being supported by said cassette shell in a cantilever fashion, said second spool piece including a second flange and a second core, a third end of said second core supported by said cassette shell in a cantilever fashion, and a fourth end of said second core, which is opposite to said third end, being associated with a second end of said first core, which is opposite said first end, said cassette comprising:
  slide allowing means associated with said second and fourth ends for allowing said spool to change between lengthened and shortened states by relative sliding of said two spool pieces, lateral edges of said roll of said photographic film being tightly clamped between said first and second flanges when said spool assumes said shortened state, said lateral edges being released from clamping by said first and second flanges when said spool assumes said lengthened state;
  a cam mechanism associated with said second and fourth ends so as to cause said spool to change from said lengthened state to said shortened state when said spool is rotated in said film unwinding direction, said first and second flanges clamp said lateral edges of said roll so as to advance said leader outward from said cassette shell when said spool is rotated in said unwinding direction, said cam mechanism causing said spool to change from said shortened state to said lengthened state when said spool is rotated in a wind-up direction which is opposite to said film unwinding direction; and
  an auxiliary linkage device associated with said second and fourth ends so as to engage said two spool pieces together when said cam mechanism is broken, said auxiliary linkage device comprising a first tongue projecting from said second end and extending in an axial direction of said spool and a second tongue projecting from said fourth end and extending in said axial direction so as to come into contact with said first tongue during rotation of said spool so as to transmit rotation of said first spool piece to said second spool piece so as to enable rotation of said spool to transport said photographic film.

18. A photographic film cassette as defined in claim 17, wherein said cam mechanism includes a cam follower and a cam groove for receiving said cam follower, a trailer of said photographic film being attached to said second core.

19. A photographic film cassette as defined in claim 18, wherein said cam follower is provided on said first spool piece, said cam groove is formed in said second spool piece, and when said first spool piece is initially rotated in said film unwinding direction, said spool changes from said lengthened state to said shortened state by relative sliding of said two spool pieces, due to engagement between said cam follower and said cam groove, and subsequently, said first and second spool pieces rotate integrally with each other while maintaining said shortened state.

20. A photographic film cassette as defined in claim 19, wherein said cam follower is a pin attached to said second end after said two cores are coupled.

21. A photographic film cassette as defined in claim 18, wherein said cam groove is formed in said first spool piece, said cam follower is provided on said second spool piece, and when said first spool piece is initially rotated in said film unwinding direction, said spool changes from said lengthened state to said shortened state by a relative slide of said two spool pieces due to engagement between said cam follower and said cam groove, and subsequently, said first and second spool pieces rotate integrally with each other while maintaining said shortened state.

22. A photographic film cassette as defined in claim 21, wherein a slit is formed so as to communicate said cam groove to said second end, said slit being adapted to insertion of said cam follower therethrough into said cam groove.

23. A photographic film cassette as defined in claim 21, wherein said cam follower is a pin attached to said second end after coupling said two cores together.

24. A photographic film cassette having a spool with a photographic film wound in a roll thereon and a cassette shell for rotatably containing said spool, said spool being rotated in a film unwinding direction so as to cause a leader of said photographic film rotating together with said spool to advance to an outside of said cassette shell through a passage mouth formed in said cassette shell, said spool including first and second spool pieces, said first spool piece including a first flange and a first core, a first end of said first core being supported by said cassette shell in a cantilever fashion, said second spool piece including a second flange and a second core, a third end of said second core being supported by said cassette shell in a cantilever fashion, and a fourth end of said second core, which is opposite to said third end, being associated with a second end of said first core, which is opposite said first end, said cassette comprising:
  slide allowing means associated with said second and fourth ends for allowing said spool to change between lengthened and shortened states by relative sliding of said two spool pieces, lateral edges of said roll of said film being clamped by said first and second flanges when said spool assumes said shortened state, said lateral edges being released from clamping by said first and second flanges when said spool assumes said lengthened state;
  a cam mechanism associated with said second and fourth ends for causing said spool to change from said lengthened state to said shortened state when said spool is rotated in said film unwinding direction, said first and second flanges clamp said lateral edges of said roll when said spool is rotated in said film unwinding direction so as to advance said leader outward from said cassette shell, said cam 36. A photographic film cassette having a spool with a photographic film wound thereon, between first and second flanges of said spool, and a cassette shell for rotatably containing said spool, said spool being constituted of a first spool piece, including said first flange and a first core, and a second spool piece, including said second flange and a second core, when said spool is rotated in a film unwinding direction, said first and second flanges are moved toward each other for clamping a roll of said photographic film therebetween so as to rotate said roll together with said spool, a leader of said photographic film being caused to advance to an outside of said cassette shell through a passage mouth for said photographic film due to rotation of said spool, said cassette comprising:

a guide shaft projecting from an end of said first core;
a sleeve formed on an end of said second core, said guide shaft being rotatably fitted in said sleeve;
a cam follower formed on said guide shaft;
a cam groove formed in an intermediate portion of said sleeve so as to cooperate with said cam follower so as to bring said first and second flanges relatively close to each other when one of said first and second spool pieces is rotated in said film unwinding direction; and
a pair of projections formed respectively on end faces of said first and second cores for causing said first and second spool pieces to rotate together by virtue of engagement between said projections when cooperation between said cam follower and said cam groove is eliminated due to breakage of one of said cam follower and said cam groove.

37. A photographic film cassette as defined in claim 36, further comprising means for preventing said guide shaft from being disengaged form said sleeve after said cam follower is inserted in said cam groove.

* * * * *